Patented Apr. 1, 1930

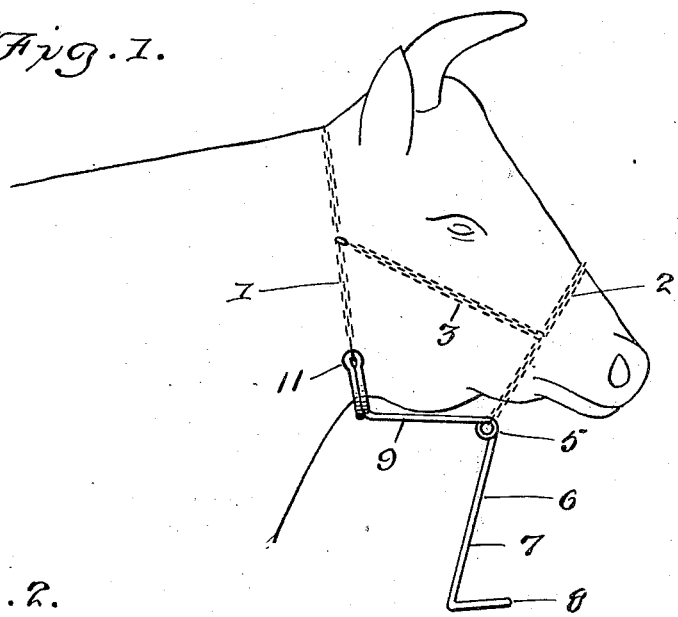
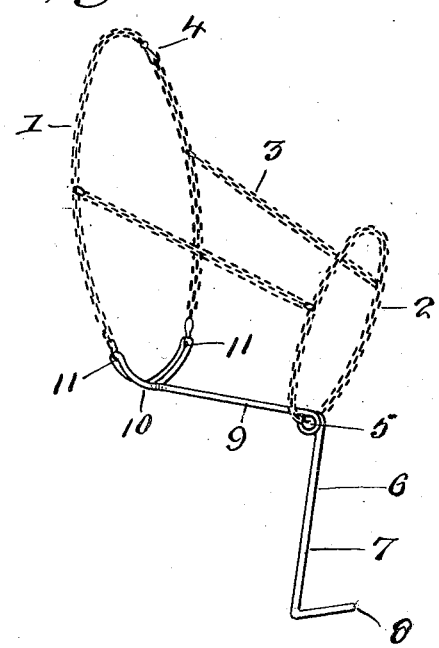

1,753,071

UNITED STATES PATENT OFFICE

CORTE J. SPENCER, OF DUNDEE, NEW YORK

COW POKE

Application filed August 6, 1928. Serial No. 297,790.

My present invention has reference to an animal poke, and my object is the provision of a device for this purpose that is adjustable so that the same may be arranged upon the head or neck of cattle of different sizes and which, while inflicting pain will not wound the animal should it attempt to stick its head through fences, and which will likewise prevent the animal from jumping fences or other obstacles.

A still further object is the provision of a poke for animals that includes an adjustable halter and a poke attached thereto, the construction embodying no sharp points or edges that will inflict injury to the animal and also the construction being such as to not interfere with the animal eating, grazing or lying down.

A still further object is the provision of an animal poke that shall be of an extremely simple construction, cheaply manufactured and readily applied to the different sizes of animals.

To the attainment of the foregoing the invention consists in the improvement as hereinafter described and definitely claimed.

In the drawings:

Figure 1 is a side elevation illustrating the application of my improvement.

Figure 2 is a perspective view of the improvement per se.

As disclosed by the drawings I employ a halter that is made up of chains. The halter includes a chain collar portion 1, a chain nose band 2 and chains 3 which connect the sides of the collar and the nose band. The collar 1 has one of its end links provided with a snap hook 4 to engage with any of the remaining links of the chain, the nose band being provided with a similar snap hook and the members 3 also having similar snap hooks on the ends thereof. By this arrangement it will be seen that the halter is adjusted so that the same can be arranged around the neck and the nose or muzzle of different sized animals. The device is primarily intended for use upon cows but, of course, may be employed in connection with other animals.

The nose band 2 passes through an eye 5 formed approximately centrally on a stiff metal rod that provides the poke 6 of the improvement. The outward angle arm of the poke, is for distinction, indicated by the numeral 7, the said arm having its end bent or extended outwardly to form the same with a finger 8. The finger is arranged at a slight upper angle with respect to the plane of the arm 7, when the device is in applied position.

The second arm of the poke is indicated by the numeral 9. This arm is arranged in an opposite direction from that of the finger 8 and underlies the throat of the animal. The arm 9 has its free end bent to provide the same with a laterally extending curved portion 10. The curved portion 10 is designed to be arranged directly beneath the throat at its juncture with the neck of the animal, and the arched or curved portion 10 provides two strands whose outer ends are spaced away from each other to provide what I will term eyes 11, and these eyes are engaged by the end links or by snap hooks on the end links of the collar 1.

With the construction as above described, it will be seen that the finger 8 of the poke when brought against an obstacle will cause the poke to swing upon its eye connection 5 with the nose band 2 to bring the latter sharply against the nose of the animal, and will inflict pain but no other injury to the animal.

Also it will be noted that when the poke is thus canted, the arched end 10 thereof will be brought against the throat of the animal to partly choke it so that the animal will be thus retarded and prevented from attempting to pass through fences or the like.

The simplicity of my construction and the advantages thereof will, it is thought, be understood so that further detailed description will not be required.

Having described the invention, I claim:

A cow poke designed to be attached to the nose band and throat strap of a halter, formed from a metal rod which is rounded upon itself to provide an eye for the reception of the halter nose band and to provide arms which extend at opposite angles from said eye, the depending arm having its end extending at an outward angle to provide a finger and the horizontal arm having its end bent to provide a laterally extending arched portion which comprises inner and outer members that have their ends rounded to provide eyes to be adjustably engaged by the throat strap of the halter, and the remainder of said latter arched portions being in contact with each other.

In testimony whereof I affix my signature.

CORTE J. SPENCER.